US011403393B1

(12) United States Patent
Satish

(10) Patent No.: US 11,403,393 B1
(45) Date of Patent: Aug. 2, 2022

(54) UTILIZING PREDICTED RESOLUTION TIMES TO ALLOCATE INCIDENT RESPONSE RESOURCES IN AN INFORMATION TECHNOLOGY ENVIRONMENT

(71) Applicant: Splunk Inc., San Francisco, CA (US)

(72) Inventor: Sourabh Satish, Freemont, CA (US)

(73) Assignee: Splunk Inc., San Francisco, CA (US)

(*) Notice: Subject to any disclaimer, the term of this patent is extended or adjusted under 35 U.S.C. 154(b) by 331 days.

(21) Appl. No.: 16/051,217

(22) Filed: Jul. 31, 2018

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
CPC ............ G06F 21/554; G06F 2221/034; G06Q 10/0639; G06Q 10/0693; G06Q 10/06311; G06Q 10/063112
USPC .......................................................... 726/23
See application file for complete search history.

(56) References Cited

U.S. PATENT DOCUMENTS

| 3,615,427 | A | * | 10/1971 | Debruyn | G03C 8/30 430/228 |
|---|---|---|---|---|---|
| 3,615,428 | A | * | 10/1971 | Weed | G03C 8/30 430/228 |
| 5,493,694 | A | * | 2/1996 | Vlcek | G08G 1/205 455/404.2 |
| 7,934,028 | B1 | * | 4/2011 | Leonard | H04L 41/0609 710/56 |
| 8,938,399 | B1 | * | 1/2015 | Herman | G06Q 20/407 705/50 |
| 9,274,877 | B2 | * | 3/2016 | Gutjahr | G06F 11/0793 |
| 9,871,818 | B2 | * | 1/2018 | Satish | H04L 63/1416 |
| 10,460,324 | B1 | * | 10/2019 | Westen | G06F 11/0793 |
| 2004/0033799 | A1 | * | 2/2004 | Fontius | H04Q 9/02 455/423 |
| 2004/0260668 | A1 | * | 12/2004 | Bradford | G06Q 10/06311 |
| 2009/0284348 | A1 | * | 11/2009 | Pfeffer | H04W 76/50 340/7.3 |
| 2010/0150122 | A1 | * | 6/2010 | Berger | H04W 4/90 370/338 |
| 2012/0151589 | A1 | * | 6/2012 | Hershey | H04L 63/145 726/24 |
| 2012/0304012 | A1 | * | 11/2012 | Atkins | G06F 11/0709 714/37 |
| 2013/0097620 | A1 | * | 4/2013 | Carey | G06F 9/542 719/318 |
| 2013/0305357 | A1 | * | 11/2013 | Ayyagari | G06F 9/00 726/22 |

(Continued)

*Primary Examiner* — Venkat Perungavoor
*Assistant Examiner* — Peiliang Pan
(74) *Attorney, Agent, or Firm* — Nicholson De Vos; Webster & Elliott LLP

(57) ABSTRACT

Described herein are systems, methods, and software to enhance the management of responses to incidents. In one example, a method of improving responses to incidents in an information technology environment includes identifying an incident associated with a component of the information technology environment. The method further provides determining a predicted resolution time for the incident by each analyst of the plurality of analysts based on the incident response information and selecting an analyst to resolve the incident based on the predicted resolution times.

27 Claims, 7 Drawing Sheets

(56) References Cited

U.S. PATENT DOCUMENTS

| | | | |
|---|---|---|---|
| 2014/0032254 A1* | 1/2014 | Della | G06Q 30/016 |
| | | | 705/7.14 |
| 2014/0270135 A1* | 9/2014 | Odinak | G06Q 10/06311 |
| | | | 379/265.03 |
| 2015/0170153 A1* | 6/2015 | Sloan | G06Q 30/016 |
| | | | 705/304 |
| 2015/0281453 A1* | 10/2015 | Maturana | G05B 23/0213 |
| | | | 379/265.12 |
| 2015/0286982 A1* | 10/2015 | Dwyer | G06Q 10/063118 |
| | | | 705/7.17 |
| 2017/0118341 A1* | 4/2017 | Kelly | H04M 3/5233 |
| 2017/0336224 A1* | 11/2017 | Kim | G06Q 10/02 |
| 2018/0027006 A1* | 1/2018 | Zimmermann | H04L 63/0245 |
| | | | 726/11 |
| 2018/0033019 A1* | 2/2018 | Mora | H04L 51/32 |
| 2018/0260760 A1* | 9/2018 | Srivastava | G06N 5/04 |
| 2018/0329768 A1* | 11/2018 | Bikumala | G06F 11/0751 |
| 2019/0246240 A1* | 8/2019 | Koohmarey | H04L 41/083 |
| 2019/0340004 A1* | 11/2019 | Garay | G06F 9/5027 |
| 2020/0012990 A1* | 1/2020 | Bhargava | G06Q 10/063112 |

\* cited by examiner

UTILIZING PREDICTED RESOLUTION TIMES TO ALLOCATE INCIDENT RESPONSE RESOURCES IN AN INFORMATION TECHNOLOGY ENVIRONMENT

TECHNICAL BACKGROUND

An increasing number of threats exist in the modern computerized society. These threats may include viruses or other malware that attack a local computer of an end user, sophisticated cyber-attacks to gather data from or otherwise infiltrate a complex information technology (IT) environment, or susceptibility to operating system crashes or hardware failures. Such IT environments include real and virtual computing devices executing various applications used to provide a variety of services, such as data routing and storage, cloud processing, web sites and services, amongst other possible services. To protect applications and services, various antivirus, encryption, and firewall tools may be used across an array of computing devices and operating systems, such as Linux® and Microsoft Windows®.

IT environments may employ a variety of computing components with different hardware and software configurations to provide the desired operation. These computing components may include end user computing devices, host computing devices, virtual machines, switches, routers, and the like. However, as more computing components are added to an IT environment, those same components become available as targets of potential security threats or incidents. The increasing number computing components in combination with limited administrative personnel and resources can make it difficult to manage the investigation and remediation of potential threats. Even with ample administrators or analyst users, it can be cumbersome to coordinate the investigation and remediation efforts.

SUMMARY

The technology described herein improves incident response in an information technology environment. In one implementation, a method of improving response times to incidents includes identifying an incident associated with a component of the information technology environment and accessing incident response information for each analyst of a plurality of analysts. The method also provides determining a predicted resolution time for the incident by each analyst of the plurality of analysts based on the incident response information and selecting an analyst to resolve the incident based on the predicted resolution times.

DETAILED DESCRIPTION

Figure 1:
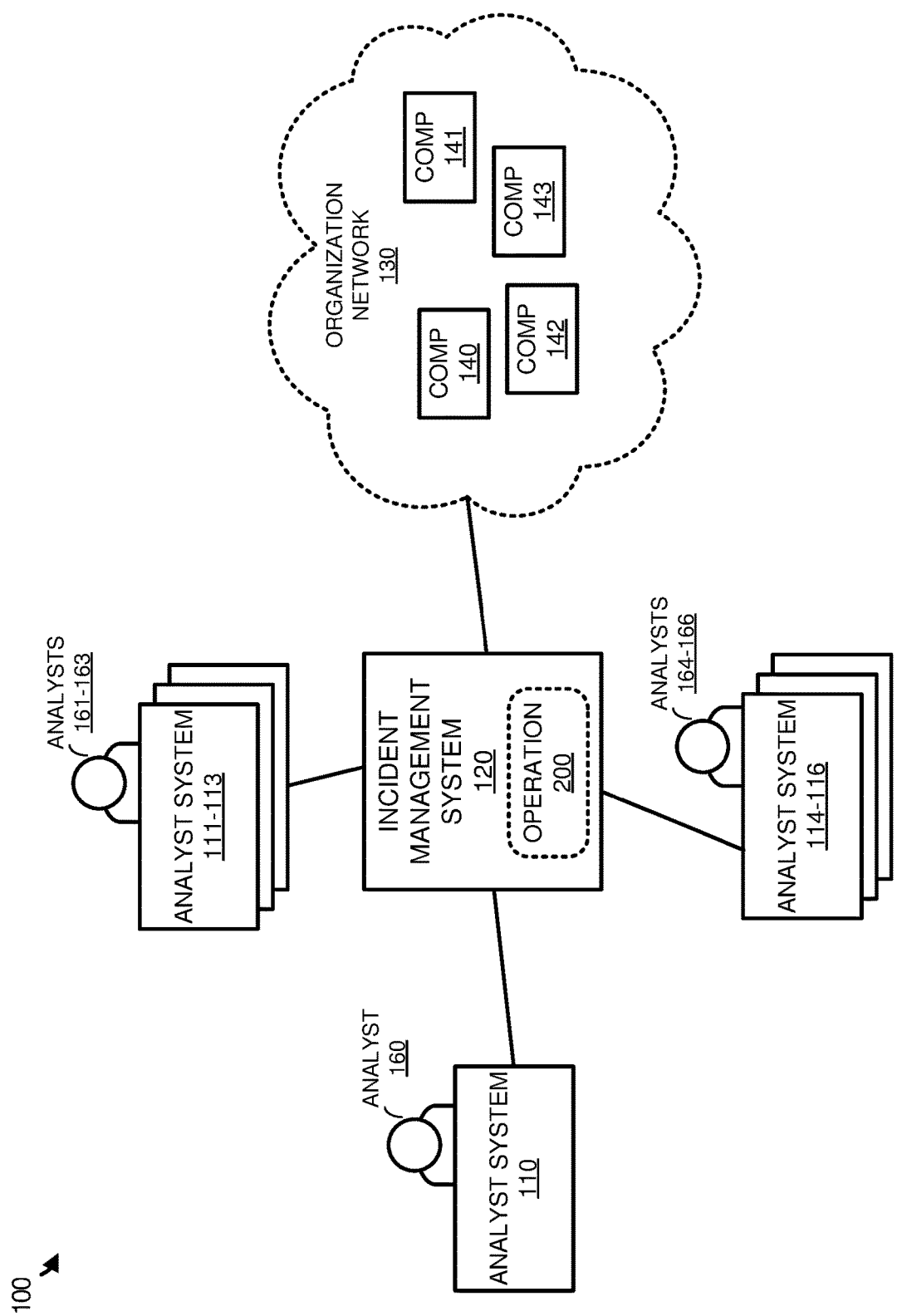
FIG. 1 illustrates an information technology environment according to manage analyst recommendations for responding to an incident according an implementation.

FIG. 1 illustrates an information technology (IT) environment 100 to manage analyst recommendations for responding to an incident according to an implementation. IT environment 100 includes analyst systems 110-116, incident management system 120, and organization network 130. Organization network 130 includes computing components (COMPs) 140-143, wherein the components may comprise any combination of physical computing systems (e.g. personal computing systems, host computing systems, and the like), virtual computing systems (e.g. virtual machines or containers), routers, switches, or some other similar computing component. Analyst systems 110-116 are associated with analysts 160-166, wherein the analysts may implement one or more actions with respect to components 140-143 of organization network 130. Although illustrated separate from organization network 130, analyst systems 110-116 may operate as part of the organization network in some examples. Incident management system 120 is communicatively coupled with analyst systems 110-116 and organization network 130 and is configured to provide operation 200 further described in FIG. 2.

In operation, components 140-143 operate in an organization network to provide various operations. The operations may include operations as an end user computing system, a server computing system, a host for one or more virtual machines, a virtual machine itself, a switch, a router, or some other similar operation in the IT environment. In operation, computing assets 140-143 may encounter incidents, such as security threats, potential security threats, or operational malfunction or crashes that can subject the organization network 130 to the loss of data, interruption in services, or some other incident. These incidents may include or be associated with viruses, malware, spyware, denial of service attacks, phishing attacks, server crashes, device failures, power outages, or some other similar incident. In response to an incident, analysts 160-166 may identify the report of the incident, investigate the incident, and initiate one or more response actions to mitigate, monitor, remove, or provide any other similar operation to remediate the incident.

In some implementations, in identifying the incidents, organization network 130 may employ security information and event management (SIEM) services that are used to automate the identification of incidents within the environment. For example, if an unknown process were operating on component 140, the SIEM service may identify the incident and provide information about the incident to incident management system 120. This information may include information about the name of the unknown process, the source of the process, any credential or licensing information for the software, or some other similar information about the process. In some examples, in addition to or in place of the automated identification of incidents within an IT environment, organization network 130 may employ a "ticket" system, wherein users and analysts of the environment may report incidents. As an example, when an email is received from an unknown party looking for personal information from an employee of the organization, the employee may report the email as a security incident. Once reported to incident management system 120, information management system 120 may identify the type of incident presented, as well as information about the source of the email.

After an incident is identified, incident management system 120 may be responsible for determining how to respond to the incident. In particular, incident management system 120 may provide status information about the incident to one or more analysts of analysts 160-166 and assist in implementing actions against the particular incident. The information provided to the analysts may include attributes of the incident (IP addresses, process names, affected users, and the like), supplementary information about the incident (derived from databases and websites), and may further include suggested security actions to be taken against the incident, wherein the suggestions may be based on the type of incident, the components involved in the incident, the severity level of the incident, and the like. In the present implementation, incident management system 120 may identify at least one analyst from a plurality of analysts based at least on each of the analyst's ability to respond to the incident in a timely manner.

Figure 2:
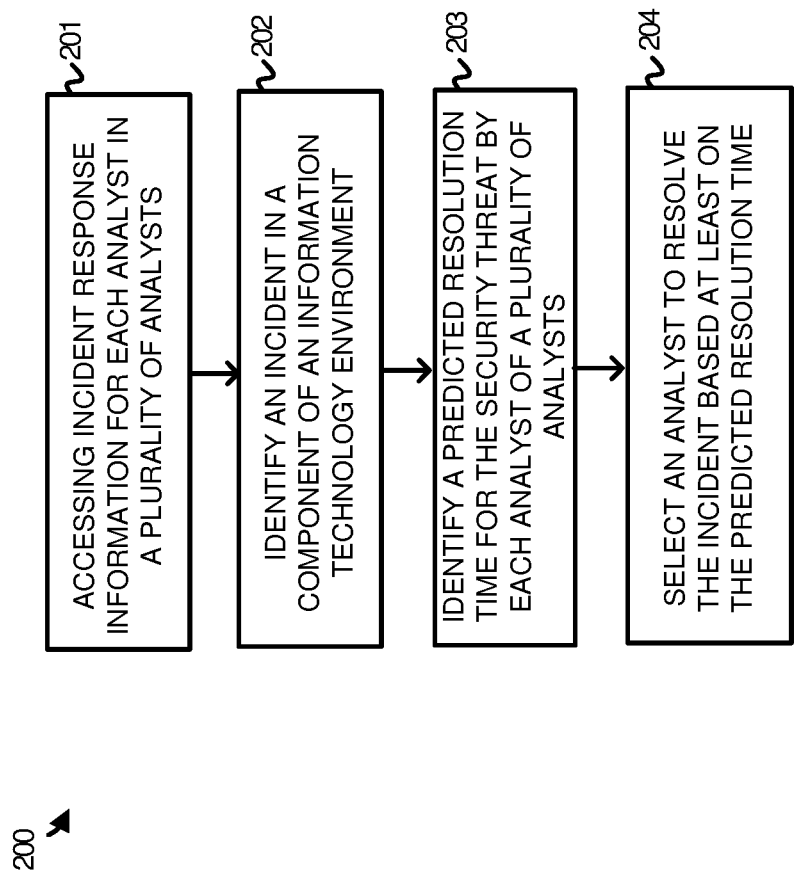
FIG. 2 illustrates an operation of an incident management system according to an implementation.

To further demonstrate the selecting of analysts to respond to an incident, FIG. 2 is provided. FIG. 2 illustrates an operation 200 of an incident management system according to an implementation. The functions of operation 200 are described parenthetically with reference to systems and elements of IT environment 100 of FIG. 1.

As depicted, operation 200 includes accessing (201) incident response information for each analyst in a plurality of analysts for the information technology environment. In some implementations, the incident response information is maintained by incident management system 120, while in other examples, the incident response information in maintained by some other commuting elements internal or external to the IT environment 100. In some implementations, the incident response information may include a current incident response queue length for each analyst, an average response time per incident by each analyst, incident type information for each incident response queue, an average resolution time for each incident type, or some other similar information, including combinations thereof. As described herein a resolution to an incident may comprise a time when an incident is mitigated, effectively monitored, removed, addressed, or deemed completed by the responding analyst or incident response system 120. For example, incident response system 120 may monitor when an unknown process is removed from a component, and deem the incident resolved when the unknown process is removed.

While the incident response information is maintained and accessed by incident response system 120, operation 200 further identifies (202) an incident in an IT environment, wherein the incident may be identified via a SIEM system (or other automated monitoring service) or may be reported by a user in IT environment 100. This incident may comprise an unknown process executing on a computing component, may comprise unknown communications for a computing component, may comprise a phishing operation with respect to one or more components in the IT environment, may comprise a denial of service incident, or may comprise any other similar incident.

In response to identifying the incident, operation 200 further identifies (203) predicted resolution times for the incident by each analyst in a plurality of analysts based on the maintained incident response information. In some examples, operation 200 may identify the predicted resolution times for all of the analysts for an IT environment, however, it should be understood that the plurality of analysts may be selected based on the availability of the analysts, the success rates of the analysts, or some other similar determination of a subset of the total analysts for the environment. In some implementations, in determining the predicted resolution times based on the maintained incident response information, incident management system 120 may use at least the length of each of the analysts' response queues, as well as information regarding the length of time that it takes for an analyst to respond to each incident in the queue. Once the required information is identified, incident management system 120 may be capable of calculating or determining the predicted resolution time for the most recently identified incident. For example, analyst 160 may have a queue length of six, and it may take analyst 160 fifteen minutes on average to respond to each incident within the queue. Consequently, if the new incident were added to the analyst's queue, then the predicted resolution time for the incident would be one hour and forty-five minutes (a total of seven incidents resolved at fifteen minutes per incident).

Once the predicted resolution times are identified for each of the available analysts, operation 200 further selects (204) an analyst to resolve the incident based on the predicted resolution time. In some implementations, in selecting an analyst, incident management system 120 may identify the analyst with the nearest predicted resolution time. In other implementations, incident management system 120 may take other considerations in determining which of the analysts is selected in responding to an incident. These other considerations or factors, which may be stored as part of the incident response information, may include information about the types of incidents within each of the analysts queues, the amount of time that it takes an analyst to respond to each individual type of incident, the success rate for each analyst responding to the incidents, the current activity level of the analyst, the schedule or calendar of the analyst, a required response time for the incident, or some other factor in selecting an analyst to respond to the incident. As an example, in addition to identifying the predicted resolution times for available analysts, incident management system 120 may also identify a required time for an incident response. Based on the required response time for the incident, incident management system 120 may identify predicted resolution times for available analysts and select an analyst that has a predicted resolution time in the required time for the incident response. As another example, incident management system 120 may identify or monitor the calendars of the various analysts as part of the incident response information and may determine the predicted resolution time based on the work schedules and calendars of the various analysts.

In some implementations, in identifying the plurality of analysts to respond to the incident, incident management system 120 may identify a subset of analysts from a larger set of analysts. In identifying the subset, incident management system 120 may identify analysts that have a specialty associated with the incident type and/or the component affected by the incident, may identify analysts that are currently working on incidents within environment, may identify analysts that are available to work based on the calendars of the various analysts, or may identify the subset of analysts in any other similar manner. Once the analysts are identified the operations of FIG. 2 may be implemented as described herein.

In some examples, once an analyst is selected to respond to the incident, incident management system 120 may provide the analyst with an alert, wherein the alert may provide various information about the incident to the responding analyst. This information may include attributes of the incident obtained from organization network 130 (IP addresses, computing component identifiers and the like), may include supplemental information obtained from one or more internal or external sources (e.g. websites and/or databases), or may include any other similar information about the incident. Additionally, incident management system 120 may provide suggested actions to be implemented for the incident, as well as suggested analysts to cooperate with the responding analyst in responding to the incident.

In the example of providing suggested actions, incident management system 120 may identify attributes of the incident (e.g. an identifier for a computing component associated with the incident, any IP addresses associated with the incident, an incident type, or some other similar information about the incident) from organization network 130 and/or supplemental sources. Once the attributes are identified, incident management system 120 may identify action suggestions based on actions against the same or similar incidents. In some implementations, incident management system 120 may identify the suggested actions based on the most frequently used actions against the same or similar type of incident, based on the most recently used actions, or based on the successfulness of the actions in containing, eliminating, or otherwise providing remediation functions for the incident.

Like providing suggested actions for an incident, incident management system 120 may, in addition to or in place of providing action suggestions, identify suggested analysts for collaboration in responding to the incident. These suggested analysts may be based on the incident type, the types of expertise for each of the analysts, the current activity of the analysts (e.g. current queue length), whether the analyst is currently scheduled to work during the period of response (which can be determined by monitoring the analysts' calendar), or some other similar determination. Once the analysts are selected, incident management system 120 may provide the analysts in the alert to the selected responding analyst, wherein the alert may include data that permits the responding analyst to select an analyst for collaboration. Once selected, incident management system 120 may provide an indication to the requested analyst notifying the requested analyst that the currently responding analyst would like to collaborate in responding to the current incident. In some implementations, the same analysts that were identified for the predicted response time may be identified as suggestions for cooperating in the response. However, additional or separate analysts may be identified to assist in the response and may be identified using the aforementioned factors (activity, work schedule, etc.).

Figure 3:
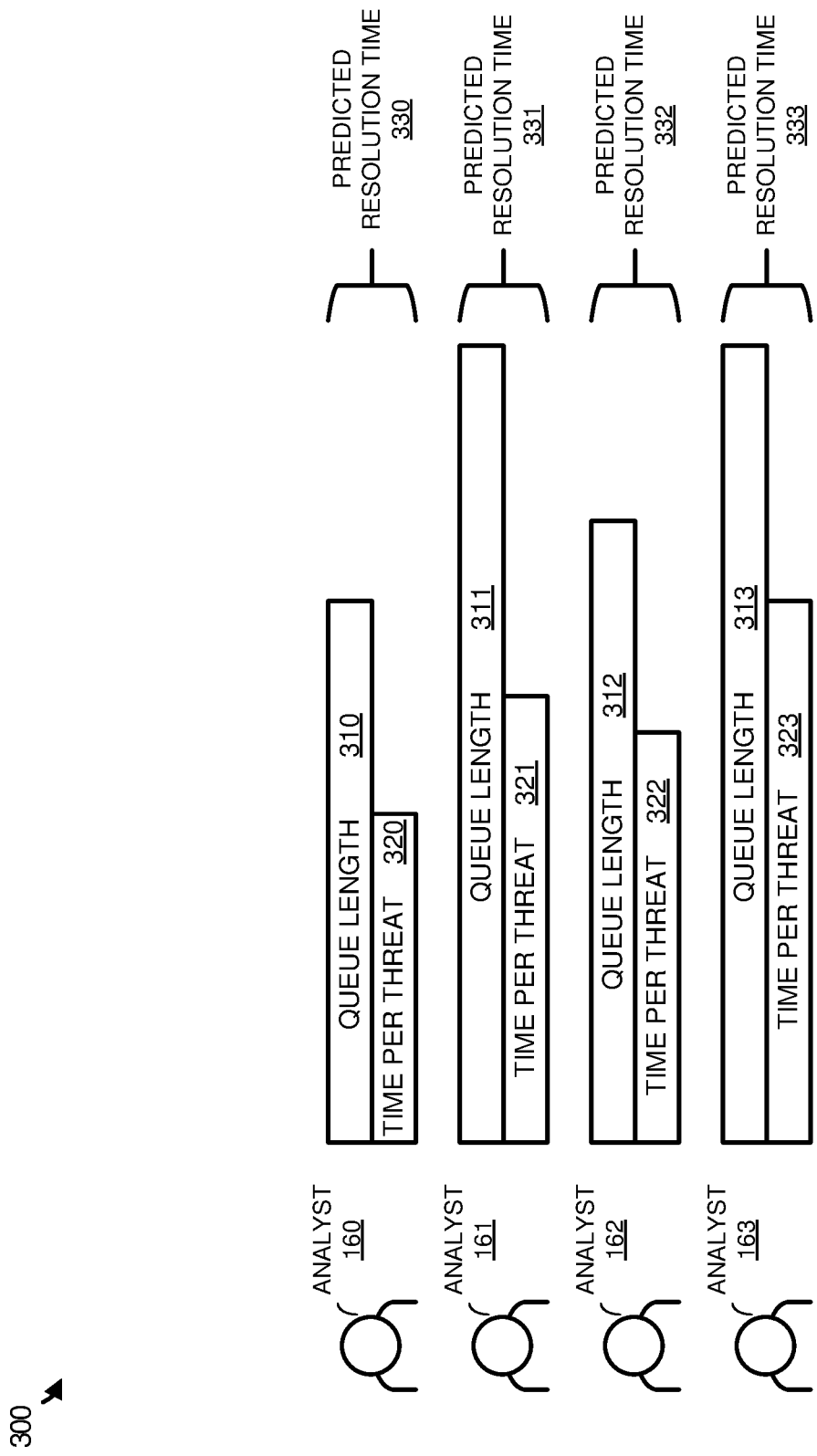
FIG. 3 illustrates an operational scenario of identifying predicted resolution times.

FIG. 3 illustrates an operational scenario 300 of identifying predicted resolution times according to an implementation. Operational scenario 300 includes analysts 160-163 from environment 100 of FIG. 1. Operational scenario 300 further includes predicted resolution times 330-333, which are determined from queue lengths 310-313 and time per incident 320-323.

As described herein, when an incident is identified in an IT environment, an incident management system may be used to identify an analyst to respond to the incident and provide information about the incident to the identified analyst. In at least one implementation, in selecting an analyst for responding to an incident, the incident management system may determine a predicted resolution time for the incident for each analyst available to respond to the incident. This predicted resolution time may be determined based at least on the response queue length for the analyst, as well as the average or mean time to respond per incident. Using the example of analyst 160, analyst 160 has a queue length 310 and a time per incident of 320, which together can be used to determine a predicted resolution time for the current incident. Here, because analyst 160 is associated with the shortest queue length and the shortest time per incident resolution, analyst 160 may have the shortest predicted resolution time. As a result, the incident management system may select analyst 160 to respond to an incident over other available analysts.

In some implementations, in addition to selecting an analyst for the incident based on the predicted resolution time, the incident management system may use other factors in selecting the responding analyst. In some examples, the incident management system may identify a subset of analysts capable of responding to the incident based on the incident type, the computing component involved with the incident, or some other determination. Once the subset of analysts is identified, the predicted resolution time may be used to select the analyst from the subset of analysts to respond to the incident.

Although demonstrated in the example of FIG. 3 using a single time per incident to determine the predicted resolution time, it should be understood that the incident management system may use additional information in determining the predicted resolution time. In some implementations, different incidents within an analyst's queue may require different resolution times. Accordingly, rather than a single average resolution time, an average resolution time may be considered for each incident type (e.g. phishing scam, virus, and the like). This information may then be compared to the current types of incidents in the queue to determine the predicted resolution time. Referring to an example in operational scenario 300, for analyst 160, the incident management system may identify incident types in the queue for analyst 160 and use the average response times for each type of incident to determine the predicted resolution time for the newly identified incident.

Figure 4:
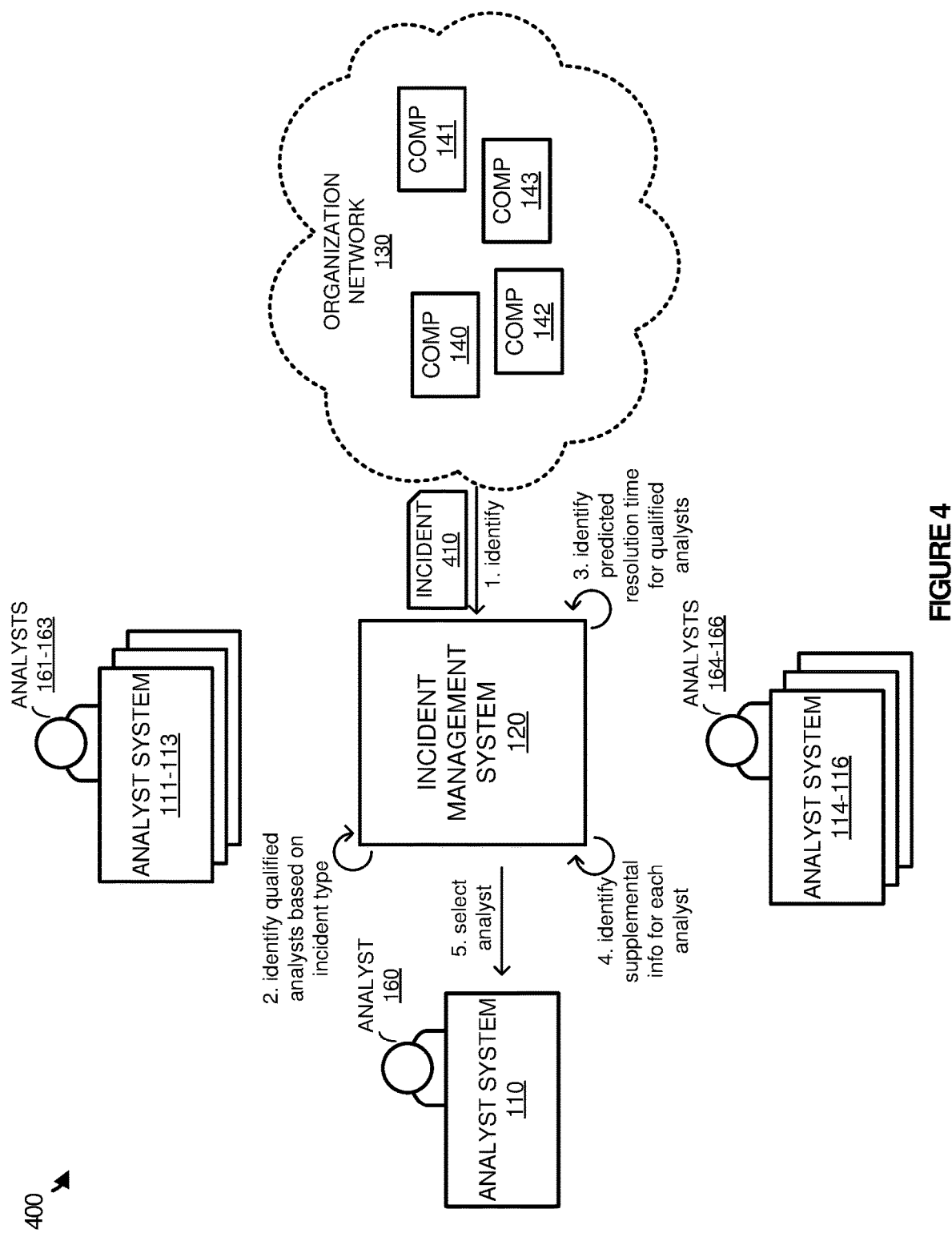
FIG. 4 illustrates an operational scenario of selecting an analyst according to an implementation.

FIG. 4 illustrates an operational scenario 400 of selecting an analyst according to an implementation. Operational scenario 400 includes systems and elements of information technology environment 100 from FIG. 1, and further includes an incident 410 identified in organization environment 130.

As depicted, at step 1, incident management system 120 identifies an incident for a component in organization network 130. This incident may be identified via an automated system, such as a STEM system, or may be reported as a ticket from a user or another analyst for the environment. In response to identifying the incident, incident management system 120 may identify a subset of analysts that are qualified to respond to the incident based on an incident type for the incident, at step 2. In identifying which analysts are qualified to support the response, incident management system 120 may identify analysts with attributes that indicate a specialization with the incident, with the component associated with the incident, or some other specialization associated with the incident. In some implementations, the qualifications of each of the analyst may be assigned by an administrator of the environment, however, it should be understood that the qualifications may also be inferred based on the responses implemented by the analysts to previous incidents. As an example, analysts 160-163 may be identified as analysts capable of processing the incident type of incident 410, wherein the incident type may be defined when the incident is reported or may be determined based on attributes of the incident. In at least one implementation, attributes or properties of the incident may be used to identify supplemental information from one or more internal or external sources (e.g. an IP address associated with the incident may be compared with a database to determine whether the IP address is known to be malicious or associated with a particular type of incident). Once the type of incident is identified, then corresponding analysts may be identified to support the response to the incident.

After identifying qualified analysts, incident management system 120 may identify a predicted resolution time for each of the qualified analysts, at step 3. This predicted resolution time may be based on the length of the response queue for each of the analysts, the historical length of time that it takes each analyst to respond to an incident in the queue, the types of incidents in each of the queues, or some other similar information to identify a predicted resolution time for each of the analyst. Here, in addition to identifying a predicted resolution time for each of the analysts, incident management system 120 further identifies supplemental information for each of the analysts, which may be maintained in at least one database that is accessible to incident management system 120. This supplemental information may include information about the overall success rate of each of the analysts in responding to incidents, the success rate of the analyst in responding to particular types of incidents, the success rate in working with a particular component of the organization network, the work schedule of the analyst, or any other similar information.

Once the supplemental information is identified, incident management system 120 may select, at step 5, an analyst based at least one the predicted resolution time and the supplemental information for each of the analysts. Using the example of operational scenario 400, incident management system 120 selects analyst 160 at analyst system 110 to support responding to the incident. In some implementations, once the analyst is selected, incident management system 120 may provide data about the incident to analyst system 110, wherein the data may include information to be displayed to the analyst and may further include the ability for the analyst to provide input regarding suggested actions for implementation and/or analysts for collaboration in responding to the incident. In some examples, the data may include attributes of the incident derived from organization network 130 and supplemental sources, may include action suggestions capable of selection by analyst 160, and may include suggested analysts capable of selection by analyst 160 for collaboration in responding to the incident.

Figure 5:
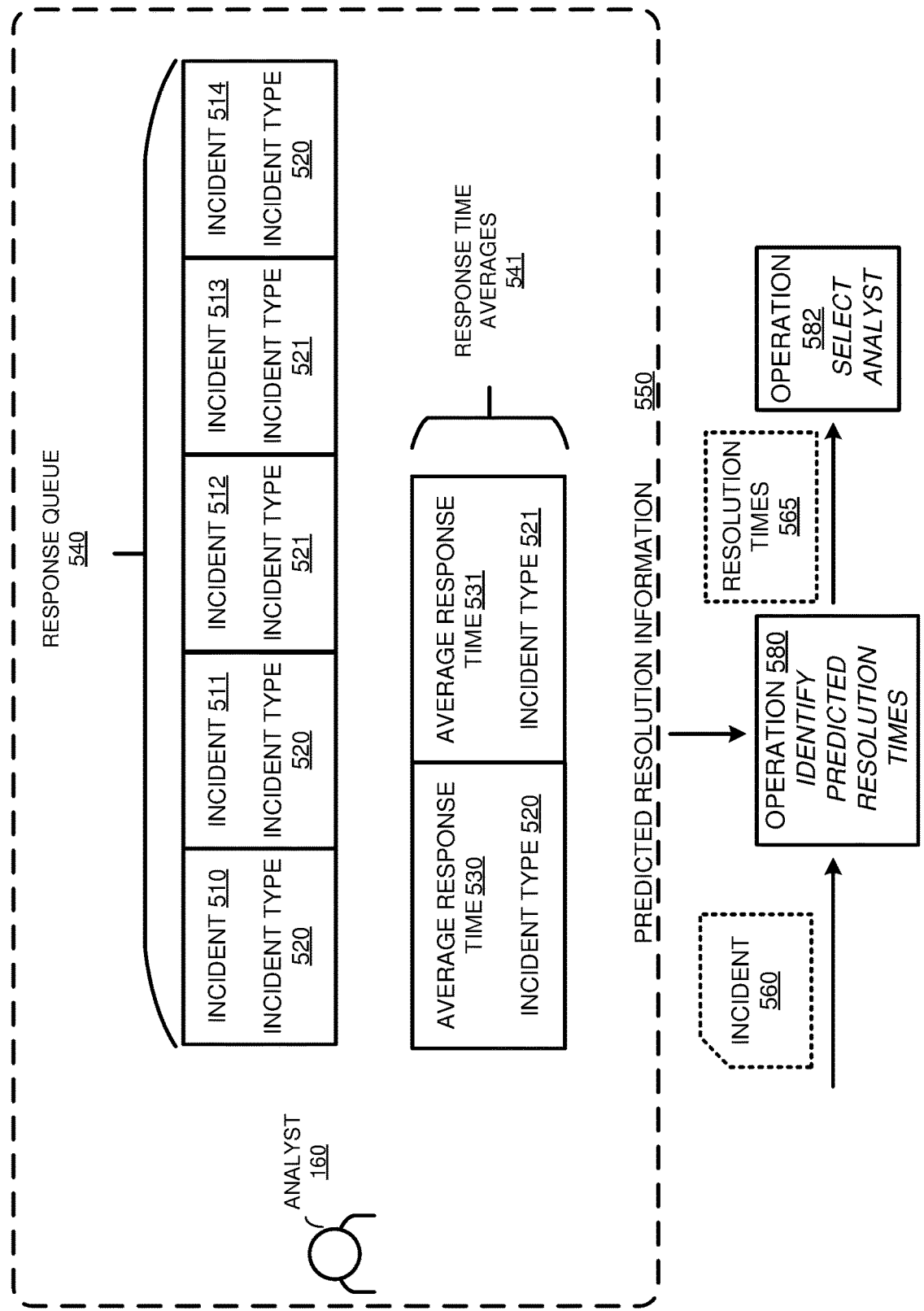
FIG. 5 illustrates an overview of selecting analysts based on predicted resolution times according to an implementation.

FIG. 5 illustrates an overview of selecting analysts based on predicted resolution times according to an implementation. FIG. 5 includes predicted resolution information 550 maintained for analyst 160 of FIG. 1. Predicted resolution information 550 further includes response queue 540 and response time averages 541. FIG. 5 further includes operations 580 and 582 that are representative of operations of that can be performed by an incident management system described herein.

As depicted, a system maintains incident response information for analysts of an information technology environment that can be used in determining which of the analysts should be used in responding to an identified incident. Here, predicted resolution information 550 is representative of the information that is maintained for a single analyst, although additional information may be maintained for additional analysts in the environment. Predicted resolution information 550 includes response queue 540, which is representative of a queue of incidents 510-514 pending to be processed by analyst 160. In particular, when an analyst is identified for responding to an incident, the incident may be added to the analyst's queue, and as the incidents are resolved, the incident may be removed from the queue. In addition to maintaining information about the response queue for each analyst, predicted resolution information 550 further includes information about the amount of time to respond to particular incidents in the environment. Here, the information is depicted as response time averages 541 with average response times 530-531. These average response times are each associated with a particular incident type of incident types 520-521, wherein each of the incidents 510-514 in response queue 540 are allocated a particular incident type.

As the predicted resolution information is maintained for the analysts of the information technology environment, an incident management system may identify an incident 560 for one or more components in the environment. When the incident is identified, operation 580 is performed to identify predicted resolution times for the incident by each analyst in the environment. In some implementations, in identifying the predicted resolution times, operation 580 may use the response time averages and the response queue length to determine when the incident will be resolved by each analyst. Using the example of analyst 160, average response time 530 may be used in conjunction with incidents 510-511 and 514 to determine a first estimated completion time, and average response time 531 may be used in conjunction with incidents 512-513 to determine a second estimated completion time for those incidents. From this information (along with the incident type for incident 560), operation 580 may determine a completion estimate for incident 560 by analyst 160.

Once resolution times 565 are determined using the predicted resolution information, operation 582 is performed that selects an analyst based at least on the predicted resolution times. In selecting an analyst, operation 582 may select the analyst with the quickest estimated response time for incident 560, may select an analyst with an estimated response time in a required response window for the incident, or may select an analyst in other similar methods. As an example, an incident type for incident 560 may be used in determining a maximum resolution time for resolving the incident. As a result, operation 582 may select an analyst from the group of analysts capable of resolving the incident in the required window.

Although demonstrated in the example of FIG. 5 as resolving an incident using resolution time, it should be understood that additional information may be used in determining the analyst to respond to an incident. This additional information may include the overall success rate of the analysts in handling incidents, the success rate in handling incidents with a similar type to that of incident 560, or some other similar information. In some examples, the predicted resolution times may be used with the additional information to generate a score for each available analyst and use the scores to select an analyst for responding to the incident.

While demonstrated in the previous examples as selecting a single analyst to respond to an incident, it should be understood that an incident management system may select multiple analysts to respond to an incident, wherein each of the analysts may provide actions for the incident.

Figure 6:
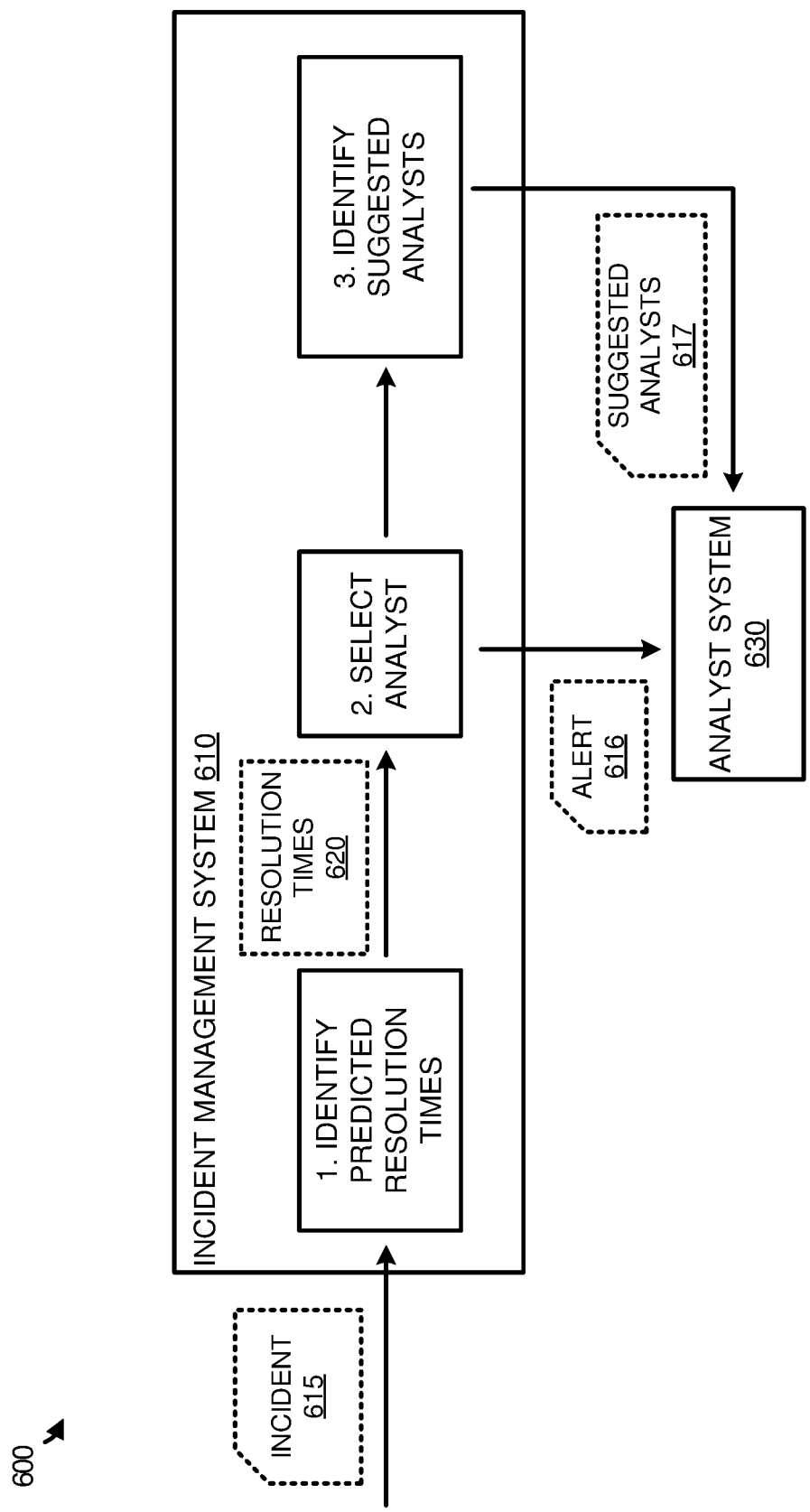
FIG. 6 illustrates an operation of an incident management system to provide suggested analysts to a responding analyst according to an implementation.

FIG. 6 illustrates an operation 600 of an incident management system to provide suggested analysts to responding analyst according to an implementation. Operation 600 includes incident management system 610, incident 615, analyst system 630, alert 616, and suggested analysts 617.

In operation, incident management system 610 identifies incident 615 and, in response to identifying the incident, identifies, at step 1, predicted resolution times 620 for analysts associated with the IT environment. Once the predicted resolution times are identified, incident management system 610 selects an analyst, at step 2, based on the resolution times, and generates an alert 616 to be provided to the identified analyst. In some implementations, this alert may include information about the incident derived from the incident itself (e.g. IP addresses of the incident, components in the environment associated with the incident, processes associated with the incident, communication activity of the incident, or some other similar information), and may further include supplemental information derived from internal and external sources, such as databases and websites (geo-location of IP addresses, incident level of unknown processes and the like).

Here, in addition to providing information about the incident, incident management system 610 further identifies, at step 3, suggested analysts 617 to be provided to analyst system 630. In identifying the suggested analysts, incident management system 610 may consider a variety of factors, including the availability of the analysts, the success rate that the other analysts have in resolving incidents, or some other similar information. For example, incident management system 610 may identify an availability rating for other analysts of the information technology environment based on the work schedule of each of the analysts, the current availability of each of the analysts (which may be determined based on queue length and average response time), the timeliness of the analyst in responding to requests from other analysts, or some other similar factor.

In some implementations, in providing the suggested analysts to analyst system 630, incident management system 610 may provide data to the analyst system, wherein the data may permit the analyst associated with analyst system 630 to request a collaboration with at least one other analyst. For example, when the suggested analysts are identified, the analysts may be provided as a selectable list, as a selectable chart, or some other similar selectable interface for the user. In some instances, incident management system 610 may provide analyst system 630 with the alert via a web interface, wherein analyst suggestion information may be provided, and user input received, via internet protocols. In other examples, analyst system 630 may include a stand-alone application capable of generating a display and receiving requests from the end user, and the incident management system may only be required to provide the data for generation at the local analyst system.

Figure 7:
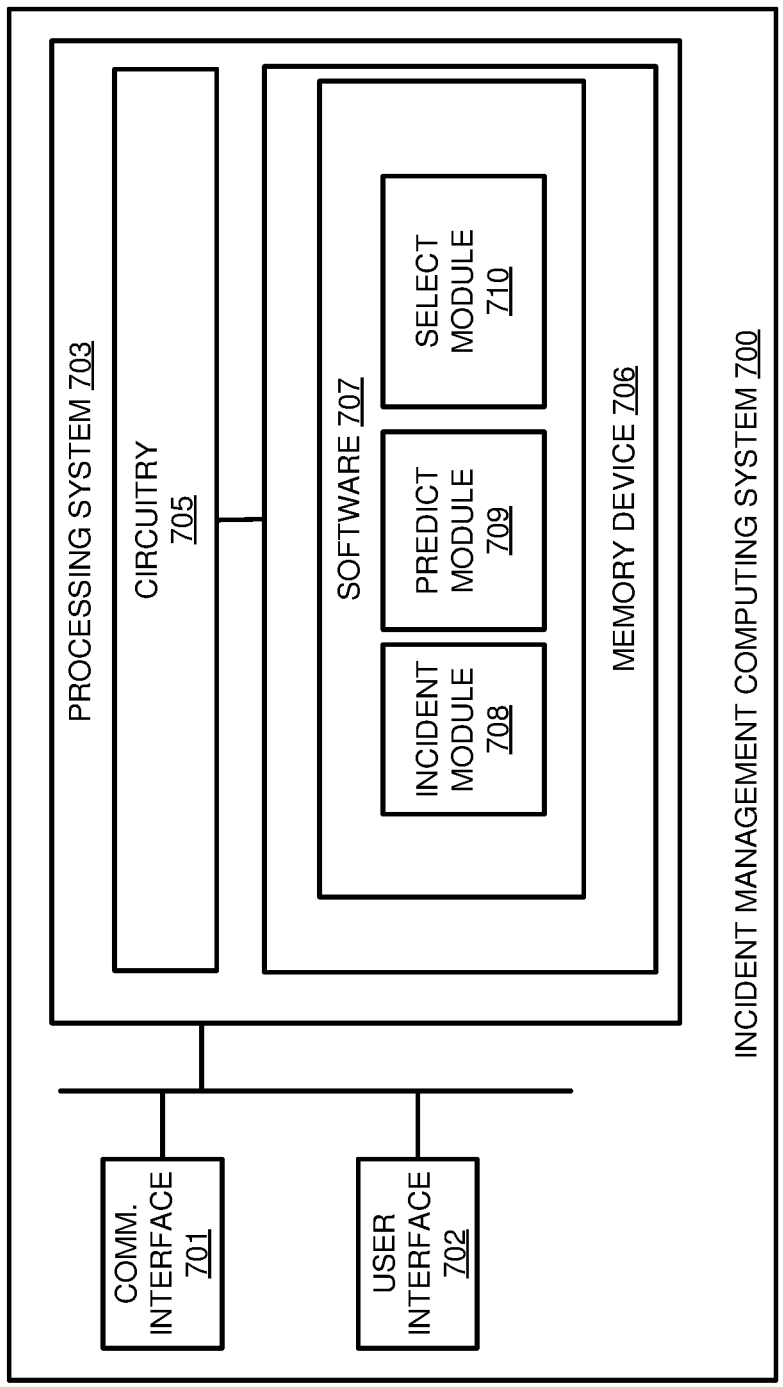
FIG. 7 illustrates an incident management computing system according to an implementation.

FIG. 7 illustrates an incident management computing system 700 according to an implementation. Computing system 700 is representative of any computing system or systems with which the various operational architectures, processes, scenarios, and sequences disclosed herein for an incident management system may be implemented. Computing system 700 is an example of incident management system 120 and 610, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may be used to communicate analyst consoles or systems as well as computing components within an organization's IT environment.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples. In some implementations, user interface 702 may operate as an analyst system to provide information about incidents to at least one available analyst.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes incident module 708, predict module 709, and select module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In at least one implementation, incident module 708 directs processing system 703 to identify an incident in the information technology environment. In response to identifying the incident, predict module 709 directs processing system 703 to predict a resolution time for the incident by each analyst in the plurality of analysts. Once the predicted resolution times are identified, select module 710 directs processing system 703 to select at least one analyst for responding to the incident based on the predicted resolution times and provides an alert to the analyst. This alert may include information or attributes of the incident and may further include action suggestions and analyst suggestions capable of assisting in responding to the incident.

In predicting the resolution times for each of the analysts, computing system 700 may use factors, such as the length of a current incident response queue for each of the analysts, the average time to respond to incidents for each of the analysts, the work schedule of the analyst, or some other incident response information maintained about the analyst. In some implementations, in addition to using the incident response information to determine which of the analysts should be used in responding to the incident, supplementary information may also be applied to determine which of the analysts should be used in responding to an incident. This information may include the success rate of each of the analysts, the success rate against particular types of incidents, the types of incidents within each of the analysts' incident response queues, or some other similar information.

Returning to the elements of FIG. 1, analyst systems 110-116 and incident management system 120 may each comprise communication interfaces, network interfaces, processing systems, computer systems, microprocessors, storage systems, storage media, or some other processing devices or software systems, and can be distributed among multiple devices. Examples of analyst systems 110-116 and incident management system 120 can include software such as an operating system, logs, databases, utilities, drivers, networking software, and other software stored on a computer-readable medium. Analyst systems 110-116 and incident management system 120 may comprise, in some examples, one or more server computing systems, desktop computing systems, laptop computing systems, or any other computing system, including combinations thereof.

Organization network 130 includes computing components 140-143, which may include physical computing systems (host computing systems, user devices, and the like), virtual computing systems, such as virtual machines and containers, routers, switches, and other similar computing systems.

Communication between analyst systems 110-116, incident management system 120, and components within organization network 130 may use metal, glass, optical, air, space, or some other material as the transport media. Communication between analyst systems 110-116, incident management system 120, and components within organization network 130 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between analyst systems 110-116, incident management system 120, and components within organization network 130 may use direct links or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
receiving, by a computer-implemented incident management system, data identifying an incident associated with a computing asset of an information technology environment, wherein the incident is associated with an incident type from a plurality of incident types, and wherein the computing asset is associated with a computing asset type;
accessing a database storing incident response information for a plurality of analysts associated with the information technology environment, wherein the incident response information indicates, for each analyst of the plurality of analysts, a plurality of average incident response times for incident types from the plurality of incident types;
determining, for each analyst of the plurality of analysts, a predicted resolution time for the incident by:
identifying an incident response queue associated with the analyst, wherein the incident response queue includes incidents associated with one or more incident types from the plurality of incident types,
determining, using the database and based on the one or more incident types, a plurality of average incident response times corresponding to the incidents in the incident response queue and to the incident, and
calculating a predicted resolution time by summing the plurality of average incident response times corresponding to the incidents in the incident response queue and to the incident;
identifying, for each analyst of the plurality of analysts, an incident resolution success rate value indicating a rate at which the analyst successfully resolves incidents involving computing assets associated with the computing asset type; and
selecting an analyst to resolve the incident based on both the predicted resolution time and the incident resolution success rate value for each analyst of the plurality of analysts.

2. The method of claim 1, wherein the incident response information comprises a current incident response queue length for each analyst in the plurality of analysts and an average response time per incident by each analyst in the plurality of analysts.

3. The method of claim 1 further comprising identifying the incident type for the incident and identifying the plurality of analysts based on the incident type.

4. The method of claim 1, further comprising:
identifying the incident type for the incident;
identifying the plurality of analysts based on the incident type;
identifying an incident resolution success rate value for each of the plurality of analysts in responding to the incident type, and
wherein selecting the analyst to resolve the incident is further based on the incident resolution success rate value for each of the plurality of analysts.

5. The method of claim 1 further comprising identifying the incident type for the incident and identifying incident types in incident response queues for each of the plurality of analysts, and wherein selecting the analyst to resolve the incident is further based on the incident types in the incident response queues and the incident type for the incident.

6. The method of claim 1 further comprising generating an alert for the selected analyst regarding the incident.

7. The method of claim 1 further comprising:
generating an alert for the selected analyst regarding the incident;
identifying one or more suggested analysts from the plurality of analysts to cooperate with the analyst in resolving the incident; and
generating an alert comprising identifiers of the one or more suggested analysts for the selected analyst.

8. The method of claim 1 further comprising:
generating an alert for the selected analyst regarding the incident;
identifying one or more suggested analysts from the plurality of analysts to cooperate with the analyst in resolving the incident; and
generating a message comprising identifiers of the one or more suggested analysts for the selected analyst;
wherein identifying the one or more suggested analysts from the plurality of analysts comprises:
identifying a success rate of each analyst in the plurality of analysts; and
identifying the one or more suggested analysts from the plurality of analysts based on the success rate of each analyst in the plurality of analysts.

9. The method of claim 1 further comprising:
generating an alert for the selected analyst regarding the incident;
identifying one or more suggested analysts from the plurality of analysts to cooperate with the analyst in resolving the incident; and
generating a message comprising identifiers of the one or more suggested analysts for the selected analyst;
wherein identifying the one or more suggested analysts from the plurality of analysts comprises:
identifying availability ratings of each analyst in the plurality of analysts; and
identifying the one or more suggested analysts from the plurality of analysts based on the availability ratings.

10. The method of claim 1, further comprising:
generating an alert for the selected analyst regarding the incident; and
identifying attributes of the incident from the information technology environment, and wherein the alert for the incident comprises at least a portion of the attributes.

11. The method of claim 1, further comprising:
generating an alert for the selected analyst regarding the incident; and
identifying attributes of the incident from the information technology environment, wherein the alert for the incident comprises at least a portion of the attributes, wherein the attributes comprise a component identifier associated with the component of the information technology environment, a process name for the incident, one or more internet protocol addresses for the incident, or data communication summaries for the incident.

12. The method of claim 1 further comprising:
generating an alert for the selected analyst regarding the incident;
identifying attributes of the incident from the information technology environment, wherein the alert for the incident comprises at least a portion of the attributes; and
identifying supplemental information from one or more internal or external resources based on the attributes, wherein the alert comprises at least a portion of the attributes and the supplemental information.

13. The method of claim 1, wherein the incident response information comprises calendars for the plurality of analysts, and wherein determining the predicted resolution time for the incident by each analyst of the plurality of analysts based on the incident response information comprises determining the predicted resolution time for the incident by each analyst of the plurality of analysts based on the calendars.

14. The method of claim 1 further comprising:
generating an alert for the selected analyst regarding the incident;
identifying one or more suggested analysts from the plurality of analysts and one or more additional analysts to cooperate with the analyst in resolving the incident; and
generating a message comprising identifiers of the one or more suggested analysts for the selected analyst.

15. An apparatus comprising:
one or more non-transitory computer readable storage media;
program instructions stored on the one or more non-transitory computer readable storage media that, when read and executed by a processing system, direct the processing system to at least:
receive, by a computer-implemented incident management system, data identify an incident associated with a computing asset of an information technology environment, wherein the incident is associated with an incident type from a plurality of incident types, and wherein the computing asset is associated with a computing asset type;
access a database storing incident response information for a plurality of analysts associated with the information technology environment, wherein the incident response information indicates, for each analyst of the plurality of analysts, a plurality of average incident response times for incident types from the plurality of incident types;
determine, for each analyst of the plurality of analysts, a predicted resolution time for the incident by:
identifying an incident response queue associated with the analyst, wherein the incident response queue includes incidents associated with one or more incident types from the plurality of incident types,
determining, using the database and based on the one or more incident types, a plurality of average incident response times corresponding to the incidents in the incident response queue and to the incident, and
calculating a predicted resolution time by summing the plurality of average incident response times corresponding to the incidents in the incident response queue and to the incident;
identifying, for each analyst of the plurality of analysts, an incident resolution success rate value indicating a rate at which the analyst successfully resolves incidents involving computing assets associated with the computing asset type; and
select an analyst to resolve the incident based on both the predicted resolution time and the incident resolution success rate value for each analyst of the plurality of analysts.

16. The apparatus of claim 15, wherein the incident response information comprises a current incident response queue length for each analyst in the plurality of analysts and an average response time per incident by each analyst in the plurality of analysts.

17. The apparatus of claim 15, wherein the program instructions further direct the processing system to identify the incident type for the incident and identify the plurality of analysts based on the incident type.

18. The apparatus of claim 15, wherein the program instructions further direct the processing system to:
   identify the incident type for the incident;
   identify the plurality of analysts based on the incident type;
   identify an incident resolution success rate value for each of the plurality of analysts in responding to the incident type; and
   wherein selecting the analyst to resolve the incident is further based on the incident resolution success rate value for each of the plurality of analysts.

19. The apparatus of claim 15, wherein the program instructions further direct the processing system to, in response to selecting the analyst, providing the analyst with an alert for the incident.

20. The apparatus of claim 15, wherein the program instructions further direct the processing system to:
   provide the analyst with an alert for the incident;
   identify one or more suggested analysts from the plurality of analysts to cooperate with the analyst in resolving the incident; and
   provide the one or more suggested analysts to the analyst, wherein providing the one or more suggested analysts to the analyst comprises providing data to an analyst system for the analyst to select at least one analyst of the one or more suggested analysts to collaborate in resolving the incident.

21. The apparatus of claim 15, wherein the program instructions further direct the processing system to:
   provide the analyst with an alert for the incident; and
   identify attributes of the incident from the information technology environment, and wherein providing the analyst with the alert for the incident comprises providing the analyst with at least a portion of the attributes.

22. The apparatus of claim 15, wherein the computing asset comprises a virtual or physical computing system, a router, or a switch.

23. A system comprising:
   a first one or more electronic devices to implement a plurality of analyst systems; and
   a second one or more electronic devices to implement an incident management system, wherein the incident management system includes instructions that upon execution cause the incident management system to:
      identify an incident associated with a computing asset of an information technology environment, wherein the incident is associated with an incident type from a plurality of incident types, and wherein the computing asset is associated with a computing asset type;
      access a database storing incident response information for a plurality of analysts associated with the information technology environment, wherein the incident response information indicates, for each analyst of the plurality of analysts, a plurality of average incident response times for incident types from the plurality of incident types;
      determine, for each analyst of the plurality of analysts, a predicted resolution time for the incident by:
         identifying an incident response queue associated with the analyst, wherein the incident response queue includes incidents associated with one or more incident types from the plurality of incident types,
         determining, using the database and based on the one or more incident types, a plurality of average incident response times corresponding to the incidents in the incident response queue and to the incident, and
         calculating a predicted resolution time by summing the plurality of average incident response times corresponding to the incidents in the incident response queue and to the incident;
      identify, for each analyst of the plurality of analysts, an incident resolution success rate value indicating a rate at which the analyst successfully resolves incidents involving computing assets associated with the computing asset type;
      select an analyst to resolve the incident by identifying, from the plurality of analysts, the analyst associated with a smallest predicted resolution time; and
      communicate an alert for the analyst.

24. The system of claim 23, wherein the incident management system is further configured to identify the incident type for the incident and identify the plurality of analysts based on the incident type.

25. The system of claim 23, wherein the incident management system is further configured to:
   identify the incident type for the incident;
   identify the plurality of analysts based on the incident type;
   identify an incident resolution success rate value for each of the plurality of analysts in responding to the incident type; and
   wherein selecting the analyst to resolve the incident is further based on the incident resolution success.

26. The system of claim 23, wherein the incident management system is further configured to:
   identify one or more suggested analysts from the plurality of analysts to cooperate with the analyst in resolving the incident; and
   communicate the one or more suggested analysts to the analyst system, wherein communicating the one or more suggested analysts to the analyst system comprises providing data to the analyst system for the analyst to select at least one analyst of the one or more suggested analysts to collaborate in resolving the incident.

27. The system of claim 23, wherein the computing asset comprises a virtual or physical computing system, a router, or a switch.

* * * * *